United States Patent
Kasterstein et al.

(10) Patent No.: US 9,912,778 B2
(45) Date of Patent: *Mar. 6, 2018

(54) METHOD FOR DYNAMICALLY DISPLAYING A PERSONALIZED HOME SCREEN ON A USER DEVICE

(71) Applicant: Doat Media Ltd., Tel Aviv (IL)

(72) Inventors: Rami Kasterstein, Givataim (IL); Amir Taichman, Haifa (IL); Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,374

(22) Filed: Jun. 30, 2015

(65) Prior Publication Data

US 2015/0304449 A1    Oct. 22, 2015

Related U.S. Application Data

(63) Continuation of application No. 14/333,710, filed on Jul. 17, 2014, now Pat. No. 9,069,443, and a
(Continued)

(51) Int. Cl.
*G06F 17/30*    (2006.01)
*H04L 29/08*    (2006.01)
(Continued)

(52) U.S. Cl.
CPC .......... *H04L 67/306* (2013.01); *G06F 3/0482* (2013.01); *G06F 3/04817* (2013.01);
(Continued)

(58) Field of Classification Search
CPC ............. G06F 3/04847; G06F 3/04817; G06F 17/30867; G06F 17/30716;
(Continued)

(56) References Cited

U.S. PATENT DOCUMENTS 5,911,043 A    6/1999    Duffy et al.
5,924,090 A    7/1999    Krellenstein
(Continued)

FOREIGN PATENT DOCUMENTS

EP    2288113 A1    2/2011
JP    2009278342    11/2009
(Continued)

OTHER PUBLICATIONS

Article: "Categories App Helps Organize iPhone Apps on your iPhone's Home Screen", iPhoneHacks.com, Oct. 2008, (http://www.iphonehacks.com/2008/10/categories-app.html).*
(Continued)

*Primary Examiner* — Evan Aspinwall
(74) *Attorney, Agent, or Firm* — M&B IP Analysts, LLC

(57) ABSTRACT

A method and system for dynamically generating and displaying a home screen on a display of a user device are provided. The method includes receiving a portion of a query; determining a query based on the portion of a query and a user experience; determining at least one estimated user intent based on the query and at least one input variable; selecting a plurality of resources of information based on the at least one estimated user intent; providing the plurality of resources to the user device; receiving a selection of a desired resource from the user device; determining a definitive user intent from the at least one estimated user intent based on the selection; generating a new home screen respective of the definitive user intent; and causing the user device to replace a current home screen with the new generated home screen.

19 Claims, 9 Drawing Sheets

Related U.S. Application Data continuation-in-part of application No. 13/712,563, filed on Dec. 12, 2012, now Pat. No. 9,141,702, and a continuation-in-part of application No. 13/156,999, filed on Jun. 9, 2011, now Pat. No. 9,323,844, and a continuation-in-part of application No. 13/296,619, filed on Nov. 15, 2011, and application No. 14/333,710, which is a continuation-in-part of application No. 13/156,999, filed on Jun. 9, 2011, now Pat. No. 9,323,844, said application No. 14/333,710 is a continuation-in-part of application No. 13/296,619, filed on Nov. 15, 2011.

(60) Provisional application No. 61/856,066, filed on Jul. 19, 2013, provisional application No. 61/653,562, filed on May 31, 2012, provisional application No. 61/354,022, filed on Jun. 11, 2010, provisional application No. 61/468,095, filed on Mar. 28, 2011.

(51) Int. Cl.
*G06F 3/0481* (2013.01)
*G06F 3/0482* (2013.01)

(52) U.S. Cl.
CPC .. *G06F 17/30716* (2013.01); *G06F 17/30864* (2013.01); *G06F 17/30867* (2013.01); *G06F 17/30905* (2013.01)

(58) Field of Classification Search
CPC ......... G06F 17/30864; G06F 17/30905; G06F 3/0482; H04L 67/306
USPC .......................................................... 707/706
See application file for complete search history.

(56) References Cited

U.S. PATENT DOCUMENTS

| | | | |
|---|---|---|---|
| 6,101,529 A | 8/2000 | Chrabaszcz | |
| 6,484,162 B1 | 11/2002 | Edlund et al. | |
| 6,546,388 B1 | 4/2003 | Edlund et al. | |
| 6,564,213 B1 | 5/2003 | Ortega et al. | |
| 6,605,121 B1 | 8/2003 | Roderick | |
| 7,266,588 B2 | 9/2007 | Oku | |
| 7,302,272 B2 | 11/2007 | Ackley | |
| 7,359,893 B2 | 4/2008 | Sadri et al. | |
| 7,376,594 B2 | 5/2008 | Nigrin | |
| 7,461,061 B2 | 12/2008 | Aravamudan et al. | |
| 7,529,741 B2 | 5/2009 | Aravamudan et al. | |
| 7,533,084 B2 | 5/2009 | Holloway et al. | |
| 7,565,383 B2 | 7/2009 | Gebhart et al. | |
| 7,599,925 B2 | 10/2009 | Larson et al. | |
| 7,636,900 B2 | 12/2009 | Xia | |
| 7,707,142 B1 | 4/2010 | Ionescu | |
| 7,721,192 B2 | 5/2010 | Milic-Frayling et al. | |
| 7,774,003 B1 | 8/2010 | Ortega et al. | |
| 7,783,419 B2 | 8/2010 | Taniguchi et al. | |
| 7,792,815 B2 | 9/2010 | Aravamudan et al. | |
| 7,797,298 B2 | 9/2010 | Sareen et al. | |
| 7,958,141 B2 | 6/2011 | Sundaresan et al. | |
| 7,966,321 B2 | 6/2011 | Wolosin et al. | |
| 7,974,976 B2 | 7/2011 | Yahia et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 8,271,333 B1 | 9/2012 | Grigsby et al. | |
| 8,312,484 B1 | 11/2012 | McCarty et al. | |
| 8,392,449 B2 | 3/2013 | Pelenur et al. | |
| 8,571,538 B2 | 10/2013 | Sprigg et al. | |
| 8,572,129 B1 | 10/2013 | Lee et al. | |
| 8,606,725 B1 | 12/2013 | Agichtein et al. | |
| 8,700,804 B1 | 4/2014 | Meyers et al. | |
| 8,718,633 B2 | 5/2014 | Sprigg et al. | |
| 8,793,265 B2 | 7/2014 | Song et al. | |
| 8,799,273 B1 | 8/2014 | Chang et al. | |
| 8,825,597 B1 | 9/2014 | Houston et al. | |
| 8,843,853 B1* | 9/2014 | Smoak .................. | G06F 3/0482 715/788 |
| 2003/0018778 A1 | 1/2003 | Martin et al. | |
| 2004/0186989 A1 | 9/2004 | Clapper | |
| 2004/0229601 A1 | 11/2004 | Zabawskyj et al. | |
| 2005/0060297 A1 | 3/2005 | Najork | |
| 2005/0071328 A1 | 3/2005 | Lawrence | |
| 2005/0076367 A1 | 4/2005 | Johnson et al. | |
| 2005/0102407 A1 | 5/2005 | Clapper | |
| 2005/0108406 A1* | 5/2005 | Lee .................. | G06F 17/30867 709/228 |
| 2005/0149496 A1 | 7/2005 | Mukherjee et al. | |
| 2005/0232423 A1 | 10/2005 | Horvitz et al. | |
| 2005/0243019 A1 | 11/2005 | Fuller et al. | |
| 2005/0283468 A1 | 12/2005 | Kamvar et al. | |
| 2006/0004675 A1 | 1/2006 | Bennett et al. | |
| 2006/0031529 A1 | 2/2006 | Keith | |
| 2006/0064411 A1 | 3/2006 | Gross et al. | |
| 2006/0089945 A1 | 4/2006 | Paval | |
| 2006/0112081 A1 | 5/2006 | Qureshi | |
| 2006/0129931 A1 | 6/2006 | Simons et al. | |
| 2006/0136403 A1 | 6/2006 | Koo | |
| 2006/0190439 A1 | 8/2006 | Chowdhury et al. | |
| 2006/0200761 A1 | 9/2006 | Judd et al. | |
| 2006/0206803 A1 | 9/2006 | Smith | |
| 2006/0217953 A1 | 9/2006 | Parikh | |
| 2006/0224448 A1 | 10/2006 | Herf | |
| 2006/0224593 A1 | 10/2006 | Benton et al. | |
| 2006/0248062 A1 | 11/2006 | Libes et al. | |
| 2006/0265394 A1 | 11/2006 | Raman et al. | |
| 2006/0271520 A1 | 11/2006 | Ragan | |
| 2006/0277167 A1 | 12/2006 | Gross et al. | |
| 2007/0011167 A1 | 1/2007 | Krishnaprasad et al. | |
| 2007/0055652 A1 | 3/2007 | Hood et al. | |
| 2007/0082707 A1 | 4/2007 | Flynt et al. | |
| 2007/0112739 A1 | 5/2007 | Burns et al. | |
| 2007/0136244 A1 | 6/2007 | MacLaurin et al. | |
| 2007/0174900 A1 | 7/2007 | Marueli et al. | |
| 2007/0195105 A1 | 8/2007 | Koberg | |
| 2007/0204039 A1 | 8/2007 | Inamdar | |
| 2007/0239724 A1* | 10/2007 | Ramer .............. | G06F 17/30864 |
| 2007/0255831 A1* | 11/2007 | Hayashi ............ | G06F 17/30867 709/226 |
| 2007/0300185 A1* | 12/2007 | Macbeth .............. | G06F 9/4443 715/825 |
| 2008/0065685 A1 | 3/2008 | Frank | |
| 2008/0077883 A1 | 3/2008 | Kim et al. | |
| 2008/0104195 A1 | 5/2008 | Hawkins et al. | |
| 2008/0114759 A1 | 5/2008 | Yahia et al. | |
| 2008/0133605 A1 | 6/2008 | MacVarish | |
| 2008/0222140 A1 | 9/2008 | Lagad et al. | |
| 2008/0256443 A1 | 10/2008 | Li et al. | |
| 2008/0306913 A1 | 12/2008 | Newman et al. | |
| 2008/0306937 A1 | 12/2008 | Whilte et al. | |
| 2008/0307343 A1 | 12/2008 | Robert et al. | |
| 2009/0013285 A1 | 1/2009 | Blyth et al. | |
| 2009/0031236 A1 | 1/2009 | Robertson et al. | |
| 2009/0049052 A1 | 2/2009 | Sharma et al. | |
| 2009/0070318 A1 | 3/2009 | Song et al. | |
| 2009/0077034 A1 | 3/2009 | Kim et al. | |
| 2009/0077047 A1 | 3/2009 | Cooper et al. | |
| 2009/0094213 A1 | 4/2009 | Wang | |
| 2009/0125482 A1 | 5/2009 | Peregrine et al. | |
| 2009/0150792 A1 | 6/2009 | Laakso et al. | |
| 2009/0210403 A1 | 8/2009 | Reinshmidt et al. | |
| 2009/0228439 A1 | 9/2009 | Manolescu et al. | |
| 2009/0234811 A1 | 9/2009 | Jamil et al. | |
| 2009/0234814 A1 | 9/2009 | Boerries et al. | |
| 2009/0239587 A1 | 9/2009 | Negron et al. | |
| 2009/0240680 A1 | 9/2009 | Tankovich et al. | |
| 2009/0265328 A1 | 10/2009 | Parekh et al. | |
| 2009/0277322 A1 | 11/2009 | Cai et al. | |
| 2009/0327261 A1 | 12/2009 | Hawkins | |
| 2010/0030753 A1 | 2/2010 | Nad et al. | |
| 2010/0042912 A1 | 2/2010 | Whitaker | |
| 2010/0082661 A1 | 4/2010 | Beaudreau | |
| 2010/0094854 A1 | 4/2010 | Rouhani-Kalleh | |

(56) References Cited

U.S. PATENT DOCUMENTS

| | | | |
|---|---|---|---|
| 2010/0106706 A1 | 4/2010 | Rorex et al. | |
| 2010/0162183 A1 | 6/2010 | Crolley | |
| 2010/0184422 A1 | 7/2010 | Ahrens | |
| 2010/0228715 A1 | 9/2010 | Lawrence | |
| 2010/0257552 A1 | 10/2010 | Sharan et al. | |
| 2010/0262597 A1 | 10/2010 | Han | |
| 2010/0268673 A1 | 10/2010 | Quadracci | |
| 2010/0274775 A1 | 10/2010 | Fontes et al. | |
| 2010/0280983 A1 | 11/2010 | Cho et al. | |
| 2010/0299325 A1 | 11/2010 | Tzvi et al. | |
| 2010/0306191 A1 | 12/2010 | Lebeau et al. | |
| 2010/0312782 A1 | 12/2010 | Li et al. | |
| 2011/0029541 A1 | 2/2011 | Schulman | |
| 2011/0029925 A1 | 2/2011 | Robert et al. | |
| 2011/0035699 A1 | 2/2011 | Robert et al. | |
| 2011/0041094 A1 | 2/2011 | Robert et al. | |
| 2011/0047145 A1 | 2/2011 | Ershov | |
| 2011/0047510 A1 | 2/2011 | Yoon | |
| 2011/0055759 A1 | 3/2011 | Robert et al. | |
| 2011/0058046 A1 | 3/2011 | Yoshida et al. | |
| 2011/0072492 A1* | 3/2011 | Mohler | G06F 3/04817 726/3 |
| 2011/0078767 A1 | 3/2011 | Cai et al. | |
| 2011/0093488 A1 | 4/2011 | Amacker et al. | |
| 2011/0113357 A1 | 5/2011 | Rosu et al. | |
| 2011/0131205 A1 | 6/2011 | Iyer et al. | |
| 2011/0225145 A1 | 9/2011 | Greene et al. | |
| 2011/0252329 A1 | 10/2011 | Broman | |
| 2011/0264656 A1 | 10/2011 | Dumais et al. | |
| 2011/0314419 A1 | 12/2011 | Dunn et al. | |
| 2012/0158685 A1 | 6/2012 | White et al. | |
| 2012/0198347 A1 | 8/2012 | Hirvonen et al. | |
| 2013/0132896 A1 | 5/2013 | Lee et al. | |
| 2013/0166525 A1 | 6/2013 | Naranjo et al. | |
| 2013/0219319 A1 | 8/2013 | Park et al. | |
| 2013/0290319 A1 | 10/2013 | Glover et al. | |
| 2014/0025502 A1 | 1/2014 | Ramer et al. | |
| 2014/0049651 A1 | 2/2014 | Voth | |
| 2014/0279013 A1 | 9/2014 | Chelly et al. | |
| 2015/0032714 A1 | 1/2015 | Simhon et al. | |

FOREIGN PATENT DOCUMENTS

| | | |
|---|---|---|
| JP | 20090285550 A1 | 11/2009 |
| JP | 2011044147 | 3/2011 |
| KR | 20030069127 | 8/2003 |
| KR | 20070014595 | 2/2007 |
| KR | 20110009955 | 1/2011 |
| WO | 2007047464 | 4/2007 |
| WO | 2009117582 | 9/2009 |
| WO | 2010014954 | 2/2010 |
| WO | 2011016665 | 2/2011 |
| WO | 2012083540 A1 | 6/2012 |

OTHER PUBLICATIONS

Categories App Helps Organize iPhone Apps on your iPhone's Home Screen, iPhoneHacks, Oct. 5, 2008, http://www.iphonehacks.com/2008/10/categories-app.html.

Currie, Brenton, Apple adds search filters, previous purchases to iPad App Store, Neowin.net, Feb. 5, 2011, http://www.neowin.net/news/apple-adds-search-filters-previous-purchases-to-ipad-app-store.

International Search Authority: "Written Opinion of the International Searching Authority" (PCT Rule 43bis.1) including International Search Report for International Patent Application No. PCT/US2012/059548; dated Mar. 26, 2013.

International Search Authority: "Written Opinion of the International Searching Authority" (PCT Rule 43bis.1) including International Search Report for corresponding International Patent Application No. PCT/US2012/069250; dated Mar. 29, 2013.

International Searching Authority: International Search Report including "Written Opinion of the International Searching Authority" (PCT Rule 43bis.1) for the related International Patent Application No. PCT/US2011/039808; dated Feb. 9, 2012.

Miser, Brad, Using iCloud with Your iTunes Music, Apps, and Books, Informit.com, Mar. 5, 2012, http://www.informit.com/articles/article.aspx?p=1833574.

Nie et al., "Object-Level Ranking: Bringing Order to Web Objects", International World Wide Web Conference 2005; May 10-14, 2005; Chiba, Japan.

Purcell, Kevin, iOS 4.2 iPad New Features: Folders, Notebooks.com, Nov. 22, 2010, http://notebooks.com/2010/11/ios-4-2-for-ipad-new-features-folders/.

Qin et al., "Learning to Rank Relationship Objects and Its Application to Web Search", International World Wide Web Conference 2008 / Refereed Track: Search—Ranking & Retrieval Enhancement; Apr. 21-25, 2008; Beijing, China.

*Alice Corp V. CLS Bank International*, 573 US_, 134 S. CT. 2347 (2014).

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Chinese Foreign Action dated Mar. 13, 2017 from the State Intellectual Property of the P.R.C. for Chinese Patent Application: 201280004301.0, China.

Kurihara, et al., "How to Solve Beginner's Problem, Mac Fan Supports" Mac Fan, Mainichi Communications Cooperation, Dec. 1, 2009, vol. 17, 12th issue, p. 92, Translated.

"Categories App Helps Organize iPhone Apps on your iPhone's Home Screen," iPhoneHacks, url: http://www.iphonehacks.com/2008/10/categoriesapp.html, pp. 1-4, date of publication: Oct. 5, 2008.

"iOS 4.2 for iPad New Features: Folders," Purcell, url: http://notebooks.com/2010/11/22/ios-4-2-foripad-new-features-folders/, pp. 1-5, date of publication Nov. 22, 2010.

Foreign Office Action for Patent Application No. 201380000403.X dated Jun. 2, 2017 by the State Intellectual Property Office of the P.R.C.

Second Office Action for Chinese Patent Application No. 201280004300.6 dated Aug. 23, 2017, SIPO.

\* cited by examiner

METHOD FOR DYNAMICALLY DISPLAYING A PERSONALIZED HOME SCREEN ON A USER DEVICE

CROSS REFERENCE TO RELATED APPLICATIONS

This application is a continuation of U.S. patent application Ser. No. 14/333,710 filed on Jul. 17, 2014, now allowed, which claims the benefit of U.S. Provisional Application No. 61/856,066 filed on Jul. 19, 2013. The Ser. No. 14/333,710 application is also a continuation-in-part (CIP) of:

(a) U.S. patent application Ser. No. 13/712,563 filed on Dec. 12, 2012, now allowed. The Ser. No. 13/712,563 application claims the benefit of U.S. Provisional Patent Application No. 61/653,562 filed on May 31, 2012. The Ser. No. 13/712,563 application is also a continuation-in-part of the below-referenced U.S. patent application Ser. No. 13/156,999 and the below-referenced U.S. patent application Ser. No. 13/296,619 filed on Nov. 15, 2011;

(b) U.S. patent application Ser. No. 13/156,999 filed on Jun. 9, 2011, now pending. The Ser. No. 13/156,999 application claims the benefit of U.S. Provisional Patent Application No. 61/354,022 filed on Jun. 11, 2010 and U.S. Provisional Patent Application No. 61/468,095 filed on Mar. 28, 2011; and (c) U.S. patent application Ser. No. 13/296,619 filed on Nov. 15, 2011, now pending.

All of the applications referenced above are herein incorporated by reference.

TECHNICAL FIELD

The disclosure generally relates to display of a home screen on a display device and, more specifically, to the dynamic display of home screens for devices having a display.

BACKGROUND

In general, home screens are used to navigate through the content of user devices such as mobile devices, tablet computers, laptop computers, and so on. Navigation through the home screen might be carried out by pressing navigation keys on the device or by manipulating other input devices typically associated with a device, such as a touch screen placed over the device's display. The home screen usually includes a plurality of icons that are static in nature and are sometimes moved from one static display of icons to another by the user. Furthermore, in mobile devices such as smart phones and tablet computers, the size of the display area is quite limited compared to sizes of the display screens typically used by desktop and laptop computer systems.

On mobile devices, the home screen typically operates as a default browser displaying static data in order to fit the variety of data streaming to and from the mobile device. The home screen typically includes icons associated with applications (e.g., a browser, a mobile application or app, and so on), as well as icons associated with documents, files, and so on. The icons are arranged according to users' preferences, but once they are set, the home screen typically cannot be dynamically changed to display a different set of icons not previously configured by the user.

It would be therefore advantageous to provide a solution that overcomes the limitations of the prior art by permitting a dynamically changing display of a home screen on a device.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method and system for dynamically generating and displaying a new home screen on a display of a user device. The method comprises determining, by a processor, a user intent using at least one input variable dynamically provided in real time; dynamically selecting a plurality of resources of information based on the user intent, wherein each selected resource has a representative icon; generating a new home screen including icons of the plurality of the dynamically selected resources of information; and causing a display of the new generated home screen on the user device including in part the icons.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
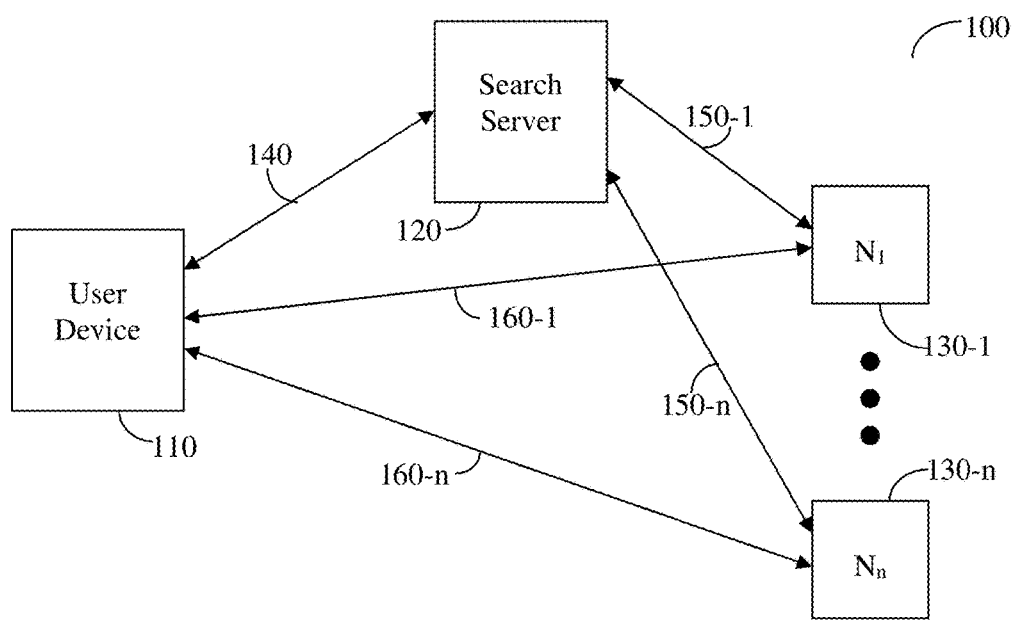
FIG. 1 is a schematic diagram of utilized to described the various embodiments for displaying dynamically changing home screens in accordance with one embodiment.

The various embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In certain exemplary embodiments disclosed herein, a system and method for displaying a personalized dynamic home screen on a device are provided. The system determines a plurality of estimated user intents based on a query input, one or more environmental variables, or one or more personal variables. A user intent represents the type of content, the content, and/or actions that may be of an interest to the user for a current time period. Respective of the plurality of estimated user intents, the system selects one or more resources of information responsive thereto and displays them on the home screen of the device.

Based on the user selection, the definitive user intent is determined, and an image as a wallpaper is displayed on the home screen of the device respective of the user intent. In another embodiment, the system may be implemented within an application installed on the device or as part of the device's operating system. The system is configured to continuously track the environmental or personal variables of the user and, upon identification of a change in the intent, the home screen of the device is updated.

FIG. 1 depicts an exemplary and non-limiting schematic diagram of a system 100 utilized for describing certain embodiments disclosed herein. A user device 110 submits a query to a search server 120 over a communication link 140. The search server 120 is also configured to receive a plurality of environmental and/or personal variables. Such environmental variables generally include variables over which users typically cannot control such as, for example, the time of day, location, motion information, weather information, sounds, images, and more. The environmental variables may be received from databases (not shown) connected to the search server 120 and/or from the user device 110. For example, location information can be received by a GPS in the user device 110, while social friends may be received from a database of a social media website.

In addition, personal variables such as a user profile, demographic information related to the user, and so on, can be retrieved by the search server 120 and utilized to determine the user's intent. The search server 120 determines the estimated user intents based on the received variables. With this aim, according to an exemplary embodiment, the search server 120 analyzes the context of each variable and correlates the analyzed variables to derive at least a category of interest. The correlation is performed based on the context(s) of the analyzed variables.

In another embodiment, the search server 120 is configured to determine the estimated user intents respective of a query or part of a query received from the at least one variable, whether environmental or personal. The search server 120 processes the input query and the received variable(s) to determine the estimated user intents. With this aim, according to an exemplary embodiment, the search server 120 analyzes the context of the query and each received variable, and correlates the analyzed variables with the query to derive at least a category of interest. The correlation is performed based on the context of the analyzed variables and query.

The estimated user intents may be provided to a user. In various embodiments, upon being provided with one or more estimated user intents, the user may select an estimated user intent. The selected user intent is the definitive user intent. Selection may be, e.g., a scroll, a click, or a tap on particular content displayed on a user device a keyboard input, a voice input, and the like.

As a non-limiting example, the search server 120 is configured to receive the query "Madonna." The search server 120 further receives information regarding the user's location from a GPS in the user device 110. In this example, the information from the GPS indicates that the user is in New York City. The query is then analyzed by the search server 120 and the estimated user intents may be determined as "the Brooklyn Museum in New York" based on the religious interpretation of the word "Madonna," as well as buying tickets to a Madonna concert in New York and viewing Madonna video clips, both based on Madonna the entertainer. Respective of the estimated user intents, a plurality of resources are provided by the search server 120 and displayed over the display of the user device 110. The user device 110 receives a selection of the Brooklyn Museum by the user. Such a selection may be, for example, a scroll over a query "Brooklyn Museum" displayed over the user device 110. Respective of the user selection, the definitive user intent is determined as "art" related.

Once the definitive user intent is determined, the search server 120 is configured to select resources from a plurality of resources 130-1 through 130-n that are the most appropriate to fulfill the user's intent. In this case, resources that would be appropriate for a definitive user intent which is "art" related respective of the query "Brooklyn Museum" may be information regarding the Brooklyn Museum. The resources 130 may include, but are not limited to, a plurality of web search engines, servers of content providers, vertical comparison engines, servers of content publishers, and so on. The resources 130 may include native applications or "cloud-based" applications, that is, applications executed by servers in a cloud-computing infrastructure such as, but not limited to, a private-cloud, a public-cloud, or any combination thereof. The cloud-computing infrastructure is typically realized through a data center. Although not shown in FIG. 1, the resources 130 may further include mobile applications (also known as apps) and/or widgets currently installed on the user device 110.

The resources 130 may be further arranged according to different categories. For example, if the query term is "Hector Berlioz," then it is most likely that the best answers will be from resources that are capable of handling classical music queries.

In an embodiment, the search server 120 is configured to determine which resources 130 would be the most appropriate resource(s) 130 to address the intent. With this aim, the resources 130 are categorized according to topics of interest, such as "music" or "carpentry tools." The topics of interest are set, for example, by the content provided. The resources 130 may also be further categorized according to demographic information (i.e., according to which demographic group a certain resource may be of interest to). The resources 130 may also be registered according to certain keywords such that resources related to the certain keywords may be associated with particular user intents. As a non-limiting example, a resource that is a Youtube® application installed on a user device may be registered as related to the keyword "video." Thus, it is more likely that any queries that are determined to relate to user intents involving videos will receive desirable results if provided to the Youtube® application.

To determine the appropriate resource(s) 130, the search server 120 matches the intent to resources based on the category of each resource. For example, if the intent is "building a bookcase," then resources categorized with the topic of interest "carpentry tools" will be selected. Moreover, as will be described herein below, the search server 120 may monitor the corresponding use by the user on the user device 110 to determine which of the resources 130 were the most appropriate for the user, thereby influencing future references provided from that resource.

The search server 120 further provides a display area containing display segments unique to each of the selected resources 130 which have been determined to be appropriate to address the user's intent. The selected resources communicate directly with their respective display segments on the user device over the communication links 160. The display area may be an application in its own right such as, but not limited to, a web browser.

In one embodiment, and as further explained herein below, only a portion of the selected resources of the resources 130 are designated with a display segment. Those selected resources that do not have an allocation of a display segment are approached when the user requests, for example, information from additional selected resources. By mere example, there may be thirty selected resources, but the display area may be designed to contain only ten display segments; therefore only the top ten of the selected resources are associated with the display segment. The other selected resources can be associated with the display segment upon a subsequent request for more information made by the user and as further explained below. As a result, it is not necessary for the search server 120 to have any specific information or data regarding the actual content residing on the resource. The only ability needed is to determine which resource of the resources 130 is appropriate to provide a certain answer to the user's intent, thereby potentially becoming a resource trusted by a user of the device 110.

In some embodiments, resources may be ranked according to their level of relevance with respect to a particular user intent. Resources that are more relevant will typically receive higher rankings. As a non-limiting example, a ranking system may assign resources numbers from 1 to 10 respective of any particular user intent, with 1 representing very low relevance and 10 representing very high relevance. In this example, respective of the user intent "video," an application used for playing videos may receive a ranking of 10, while an application used for driving directions may receive a ranking of 1. In a further embodiment, if only some of the resources are associated with a display segment, the resources that are ranked highest may be the resources associated with the display segment.

According to certain embodiments, the search server 120 generates a query respective of the determined intent, or variations thereof, to a resource in a communication format that is proper for that specific resource, thereby enabling search of such resources that require a customized interface to perform any kind of successful processing. The communication links 140, 150, and 160 may occur over a common network such as, but not limited to, a local area network (LAN), a wide area network (WAN), a metro area network (MAN), the world wide web (WWW), the Internet, a wired network, a wireless network, and the like, as well as any combination thereof. The various elements of the system 100 are further described in the above-referenced co-pending U.S. patent application Ser. No. 13/156,999 filed on Jun. 9, 2011 to Kasterstein, et al., titled "SYSTEM AND METHODS THEREOF FOR ENHANCING A USER's SEARCH EXPERIENCE", assigned to common assignee, and which is hereby incorporated by reference for all that it contains.

Figure 2:
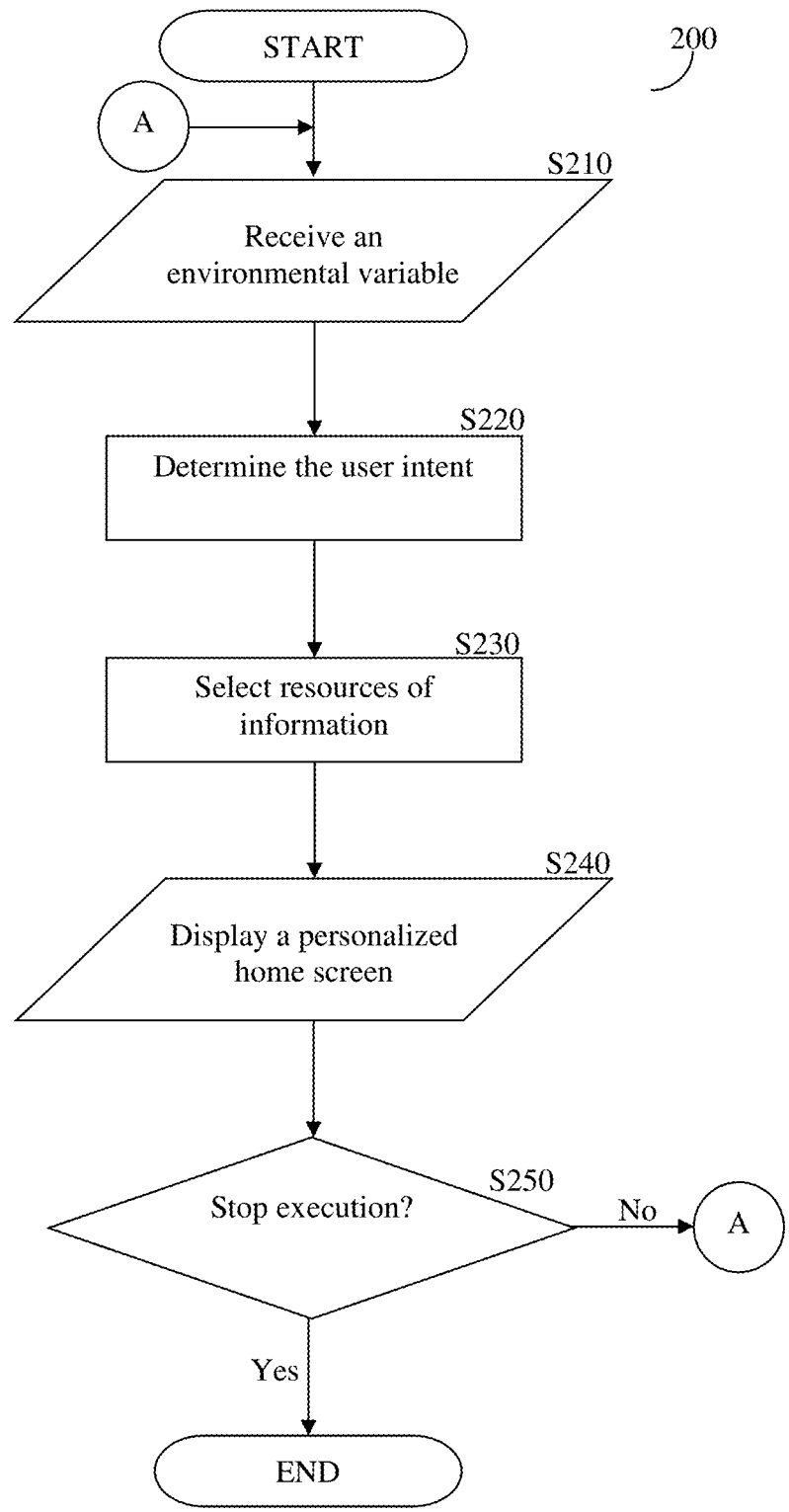
FIG. 2 is a flowchart describing a method for displaying a dynamic home screen on a device according to one embodiment.

FIG. 2 depicts an exemplary and non-limiting flowchart 200 of a method for generating and displaying a dynamic home screen over a user's device according to one embodiment. In S210, at least one environmental variable is received by the search server 120. An environmental variable may be, for example and not by way of limitation, the location of the user mobile device, the device's rate of motion, the time of day, and so on. In one embodiment, the search server 120 may be preconfigured to include a set of variables defined by the system or by the user. For example, "home" may mean the physical location of the user's home, whereas "morning" may mean any time between 6 am and 10 am.

Optionally, the search server 120 may also retrieve or receive one or more personal variables associated with the user. As mentioned above, such variables may include, but are not limited to, a user profile, demographic information, user's preferences, and so on. Such variables may be retrieved or received from systems and databases that generate and/or maintain the variables. In S220, based on the received variables, the intent of the user is determined. The received variables include at least one environmental variable and, optionally, one or more personal variables. The user intent may represent the type of content, the content, and/or actions that may be of an interest to the user at a current time period. In one embodiment, the user intent is determined by monitoring at least the received environmental variables (or variables determined by the users to be monitored) to determine any changes in the variables that may in turn change the user intent. Then, the changed environmental variables are analyzed to determine the current (updated) intent of the user. The changed environmental variables may be further correlated with the personal variables.

For example, if the time is 8 am on Monday and the user's device location is the user's home, then the user intent may be related to "review news" or "review emails." If the location changes to away-from-home, and the GPS information indicates the user is moving, the user intent may be changed to receiving traffic updates or listening to the user's favorite radio station during the user's commute. As another example, if the device's motion is determined to be at a rate of a person walking, and the location is determined as $5^{th}$ Avenue in New York City, the user intent may be "nearby shopping stores."

In S230, one or more resources of information (e.g., resources 130) related to the determined intent are selected. For example, if the user intent is "review news" (as discussed above), then the selected resources may be one or more news websites or apps (mobile applications) that the user usually reviews. The favorite news websites or apps may be determined, for example, based on a different environmental variable, (e.g., search/browsing history) and/or a personal variable (e.g., a user profile).

In S240, a personalized home screen respective of the selected resources is generated to be displayed on the user's device. Each selected resource is associated with an icon. An icon may be any type of graphical symbol rendered and displayed over the display on the user device. Clicking or tapping on the icon typically activates an app or provides a link to an information resource (e.g., news website), thereby providing the user with the desired information and/or action. In one embodiment, an icon included in the personalized home screen may be in a form of a widget or a gadget that can activate and/or provide a like to a respective selected resource. It should be noted that the widget or gadget is associated with a resource or information selected as described in detail above.

In S250, it is checked whether additional variables have been received and, if so, execution continues with S210; otherwise, execution terminates.

Figure 3:
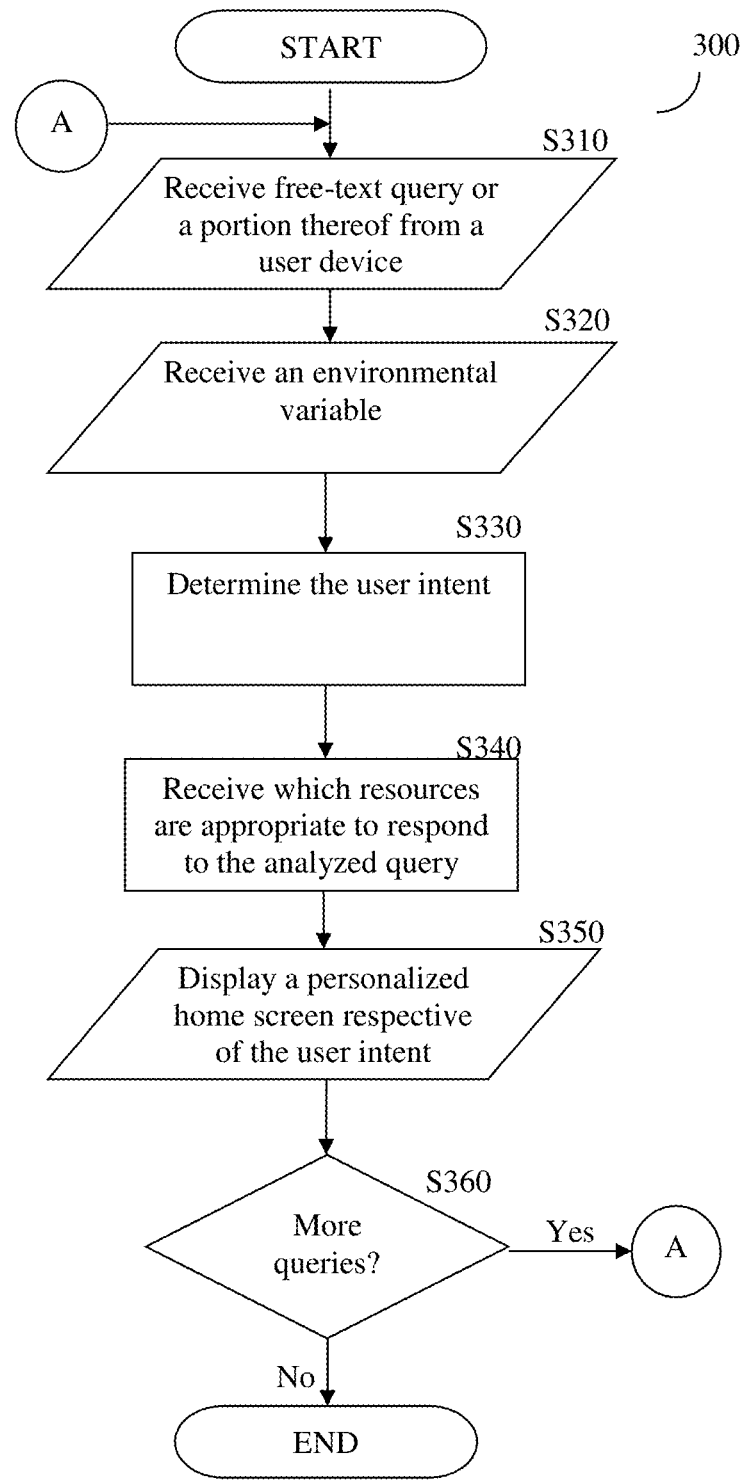
FIG. 3 is a flowchart describing a method for displaying a dynamic home screen respective of a user intent according to another embodiment.

FIG. 3 depicts an exemplary and non-limiting flowchart 300 describing a method for generating and displaying a dynamic home screen respective of a query or part of a query and at least one environmental variable, according to another embodiment. The method may be performed by the search server 120.

In S310, a query, such as a free-text query, or a portion thereof, from a user device (e.g., a user device 110) is received. The query may be, for example, a keyword, a portion of a keyword, a plurality of keywords, a character, a series of characters, and the like.

In one embodiment, the search server 120 is configured to auto-complete at least a portion of a query and suggest at least a query based on, for example, a user experience.

In S320, at least an environmental variable is received. In S330, the user's intent respective of the query is determined, based on the at least one environmental variable as described in detail above. The user intent can also be determined using one or more personal variables that may be correlated with the environmental variables.

In S340, a list of relevant resources from the plurality of resources 130-1 through 130-n is determined for the received query respective of the determined intent. Relevant resources may be, but are not limited to, resources that would be appropriate for a particular user intent. Appropriateness of resources to user intents is described further herein above with respect to FIG. 1.

In S350, a personalized home screen is generated to include the resources 130 determined to be relevant. The generated home screen is displayed over the user's device. As noted above, the selected resource is associated with an icon on the generated home screen. An icon may be any type of graphical symbol rendered and displayed over the display of the user device. Clicking or tapping on the icon activates an app (mobile application) or provides a link to an information resource (e.g., news website), thereby providing the user with the desired information and/or action.

In S360, it is checked whether there are additional queries to handle and, if so, execution continues with S310; otherwise, execution terminates.

As noted above, in one embodiment, an icon included in the personalized home screen may be in a form of a widget or a gadget. It should be noted that the widget or gadget is associated with a resource of information selected as described in detail above.

The following are non-limiting examples for the operation of the method described with reference to FIG. 3. If the user often enters queries related to high-end brands, resources which are occasionally selected by other users who tend to search high-end brands are displayed. To this end, search server 120 may be further configured to identify the time (given as an environmental variable) of the day the query is entered.

As another example, if the user enters the query term "eat" in the morning, the search server 120 would display results related to breakfast, and if the user enters the query term "eat" in the evening, the system displays responses related to dinner. As another example, if the environmental variable is the temperature at the user's location and the input query is "clothing", the search server 120 selects resources respective of the temperature and the term clothing. Examples for resources that may be displayed in response to the query term "clothing" and the environmental variable temperature indicating "winter season" are on-line stores that sell winter clothing. Again, the selected resources are displayed as icons on the home screen of the user's device 110.

In yet another example, the environmental variable is the state of motion of the device, indicating if the user is static or moving. The search server 120 selects resources and displays icons associated with the selected resources based on this identification and an input query. For instance, if the user enters the query term "Pizza" while moving, the search server 120 may select resources related to Pizza restaurants in the vicinity of the user's location. If the user enters the query term "Pizza" while in a static mode, the server 120 displays resources related to Pizza deliveries or pizza recipes. Again, the selected resources of information are displayed as icons on the home screen of the user's devices such that the home screen is dynamically changed respective of the query and the corresponding variables. A person of ordinary skill in the art would readily appreciate that the operation of displaying a dynamic home screen as described in FIG. 2, and the operation of displaying a dynamic home screen respective of the intent of a query as described in FIG. 3, may be integrated without departing from the scope of the disclosed embodiments.

Figure 4:
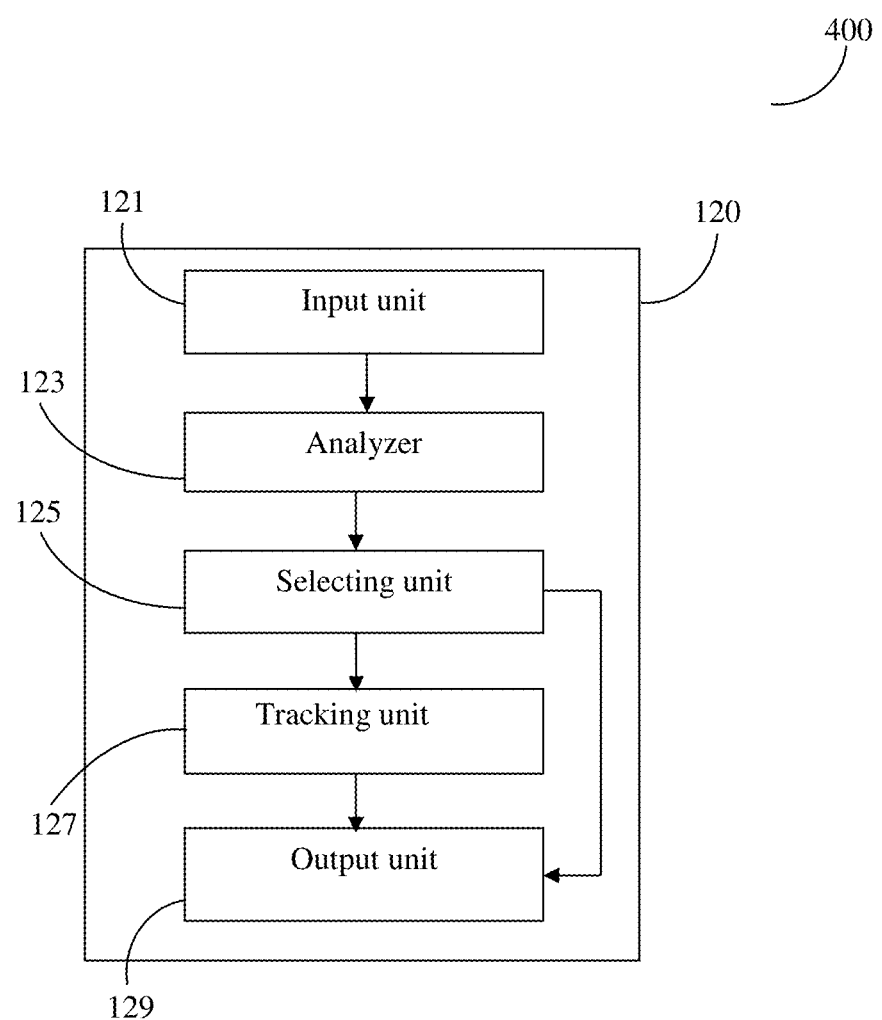
FIG. 4 is a schematic block diagram of a search server in accordance with one embodiment.

FIG. 4 depicts an exemplary and non-limiting schematic diagram 400 of the search server 120 configured according to an embodiment. According to an exemplary embodiment, the search server 120 includes an input unit 121 for receiving queries. In this embodiment, queries are typically received from the user device 110. Through the input unit 121, a plurality of environmental variables is also received. The search server 120 also includes an analyzer 123, a selection unit 125, a tracking unit 127, and an output unit 129.

The analyzer 123 is configured to determine the user intent based on one or more environmental variables and, in some cases, using personal variables as discussed in detail above. The analyzer 123 can also determine the intent respective of an input query as discussed above. The selection unit 125 is configured to select at least one resource from a plurality of resources of information respective of the intent and extracts at least an icon or a widget respective of each selected resource. The tracking unit 127 is configured to continuously track changes of the at least an environmental variable and prompts updates of the home screen respective of the changes. The output unit 129 is further configured to generate a new home screen that includes the extracted icons and causes the device to replace a current home screen with the newly-generated home screen.

In some implementations, each of the analyzer 123, selection unit 125, and the tracking unit 127 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 5A:
FIGS. 5A and 5B are screenshots of a dynamic home screen of a device showing the operation of the system when the user intent changes according to various embodiments disclosed herein.
Figure 5B:

FIGS. 5A and 5B depict exemplary and non-limiting screenshots 500A and 500B, respectively, of a personalized dynamic home screen of a mobile device. In 500A, a default home screen with icons is shown. The user may enter a query such as, for example, the term "Sushi," in window 510A. In one embodiment, instant wallpaper with one or more pictures respective of the query intent 520A is provided, as described in further detail in co-pending U.S. patent application Ser. No. 13/296,619 filed on Nov. 15, 2011 to Kasterstein, et al., titled "A SYSTEM AND METHODS THEREOF FOR INSTANTANEOUS UPDATE OF A WALLPAPER RESPONSIVE OF A QUERY INPUT AND RESPONSES THERETO," assigned to common assignee, and which is hereby incorporated by reference for all that it contains.

An environmental variable respective of the user's current location is provided to the search server 120 by, for example, the Global Positioning System (GPS). The user's current location is used by the search server 120 to determine whether the user is at his home or away.

Screenshot 500A is a home screen being generated in response to the determination that the user is at his home. Accordingly, as the search server 120 identifies the term "Sushi," it displays a wallpaper related to this user intent as well as an icon for displaying results respective for the intent, for example, a resource displaying instructions on how to make sushi at home 530A.

Screenshot 500B is a home screen being generated in response to the determination that the user is away from home, and responsive to the query term "Sushi". The screenshot 500B displays, as a result, icons related to the new intent such as, for example, a link to a website 510B specifying the sushi restaurants near the current location of the user.

Figure 6:
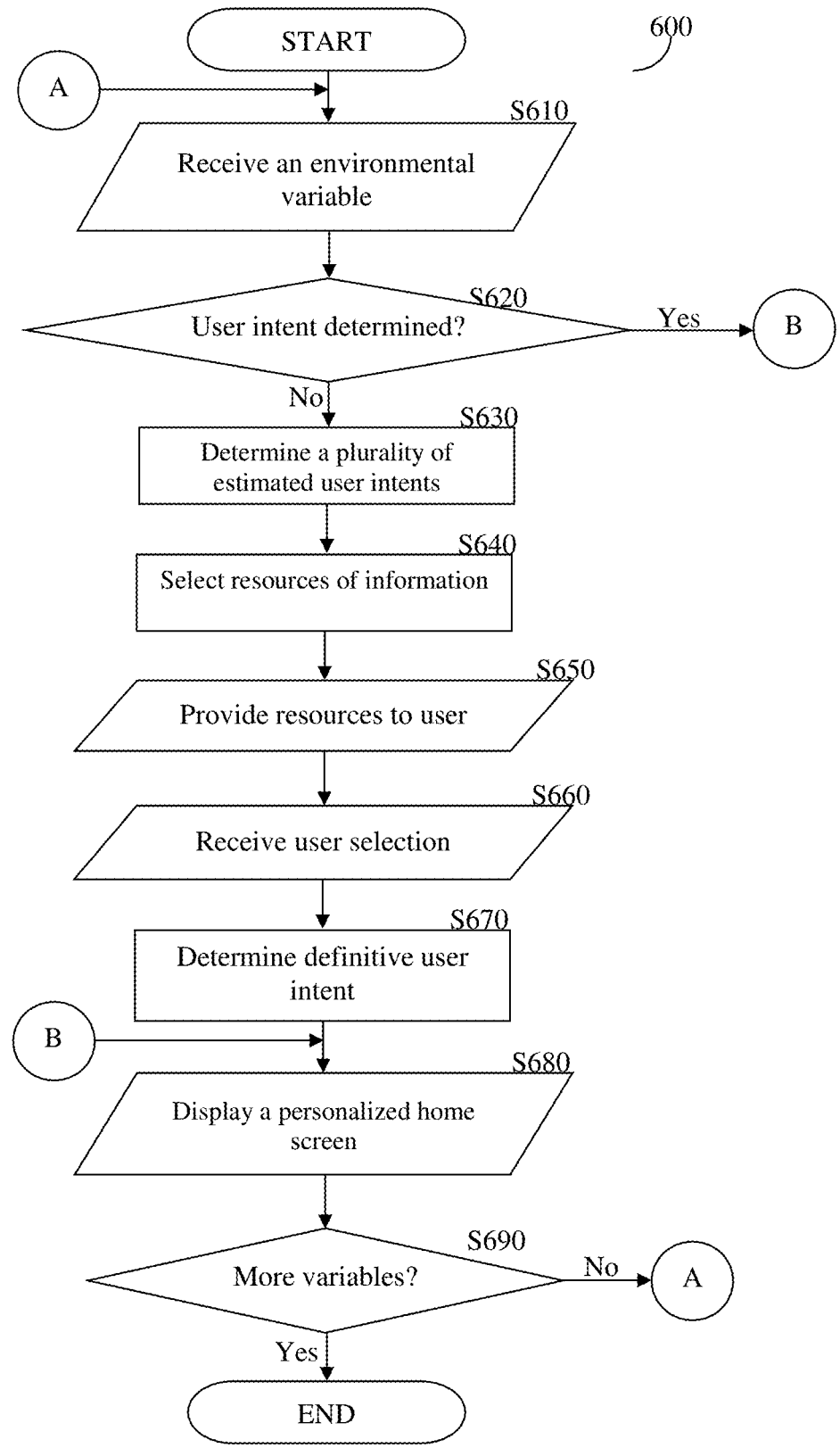
FIG. 6 is a flowchart describing a method for generating and displaying of a dynamic home screen respective of a user intent according to an embodiment.

FIG. 6 depicts an exemplary and non-limiting flowchart 600 of a method for generating and displaying a dynamic home screen on the display of a user device respective of a user intent, according to one embodiment. The method may be performed by the search server 120.

In S610, at least one environmental variable is received. Optionally, the search server 120 personal variables associated with the user may be also retrieved or received one or more.

In S620, it is checked whether the user intent has been determined and if so, execution continues with S670; otherwise, execution continues with S630.

In S630, based on the received one or more variables, a plurality of estimated user intents are determined. The received variables include at least one of: environmental variables or personal variables. The intents may represent the type of content, the content, and/or actions that may be of an interest to the user at a current time period. In one embodiment, the estimated user intents are determined by monitoring at least the received environmental variables (or variables determined by the users to be monitored) to determine any changes in the variables that may in turn change the estimated user intents. Personal and environmental variables are described further herein above with respect to FIG. 1.

In S640, resources from a plurality of resources 130-1 through 130-n that are the most appropriate to fulfill each of the plurality of estimated user intents are selected. For example, in cases where the user device 110 identified as moving in a running pace, several user intents may be estimated and therefore several resources are identified as appropriate, for example, sport applications, music applications, etc. As another example, when the user device 110 is identified as moving in a driving pace, navigation applications may be determined as appropriate.

In S650, a personalized home screen respective of the selected resources is generated to be displayed on the user device 110. The personalized home screen includes a plurality of display segments representing each of the plurality of selected resources. According to one embodiment, the display of the user device 110 may be partitioned into several portions, wherein each portion contains at least one resource selected as appropriate to serve an estimated user intent.

In S660, a user selection of an estimated user intent is received. The user selection may be by a gesture over the display of the user device 110. The user's gesture may be: a scroll on the portion of the display, a press on the portion of the display, and/or a response to the portion of the display, and so on. The gesture may further be a tilt of the user device 110.

In S670, respective of the user selection, the definitive user intent is determined. According to another embodiment, in case a user's selection is not received after a certain period of time, the definitive user intent may be determined as different from the estimated user intents and, therefore, other resources may be provided. According to one embodiment, the definitive user intent is explicitly received from the user and the personalized home screen is displayed respective thereto.

In S670, a personalized home screen respective of the definitive user intent is generated to be displayed on the user's device.

In S680, it is checked whether additional variables have been received and, if so, execution continues with S610; otherwise, execution terminates.

Figure 7:
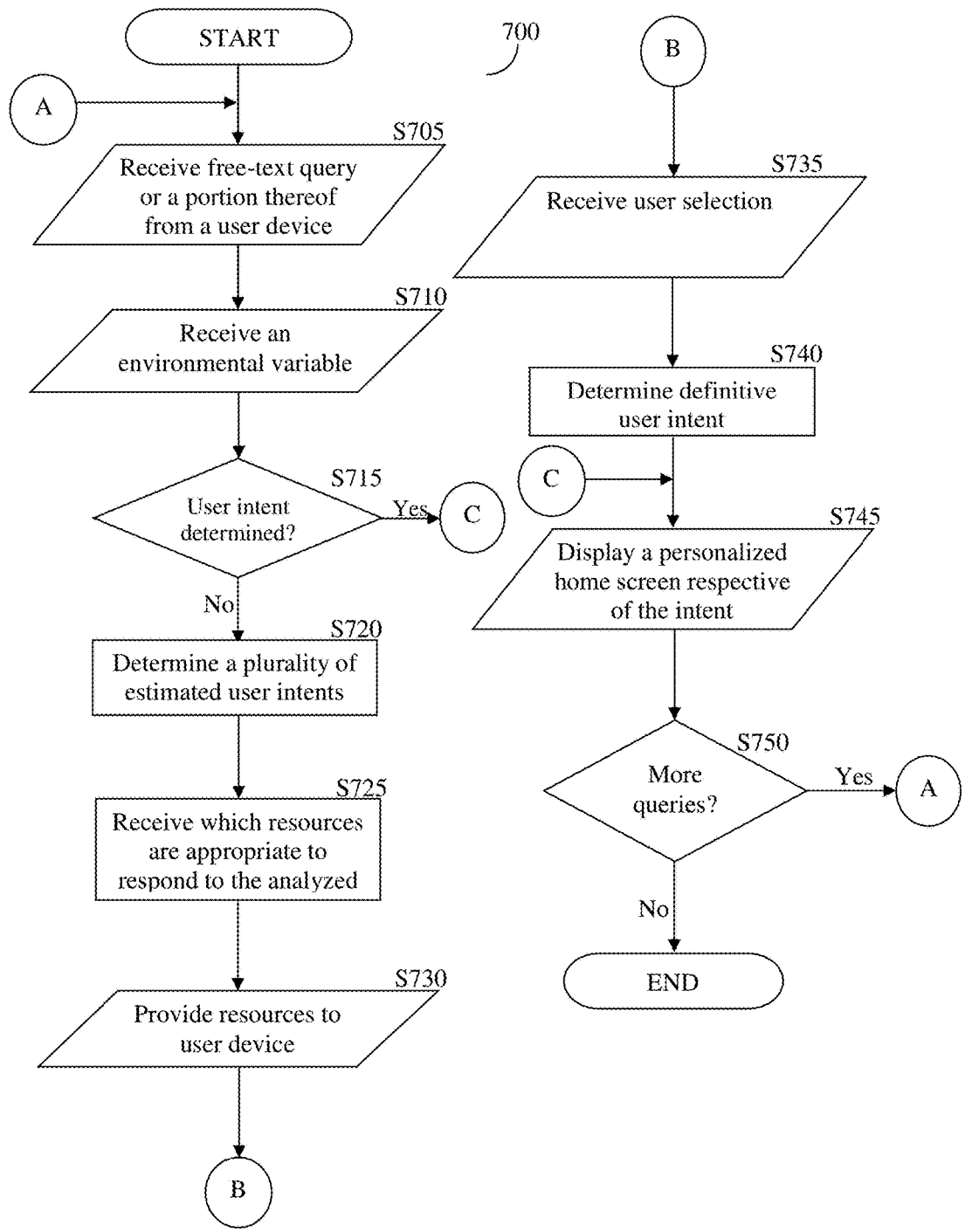
FIG. 7 is a flowchart describing a method for generating and displaying of a dynamic home screen respective of a user intent according to another embodiment.

FIG. 7 depicts an exemplary and non-limiting flowchart 700 describing a method for generating and displaying a dynamic home screen respective of a query or part of a query and at least one environmental variable, according to another embodiment. The method may be performed by the server 120. In S705, a query, such as a free-text query, or a portion thereof, is received from a user device such as, for example, a user device 110. The query may be, for example, a keyword, a portion of a keyword, a plurality of keywords, a character, a series of characters, a scroll, a click, a press on a touch screen, and the like.

According to one embodiment, a portion input query can be auto-completed based on, for example, a user experience. According to another embodiment, the user experience may be further used to correct the spelling of the query or for disambiguation of the query.

In S710, at least an environmental variable is received. Environmental variables are described further herein above with respect to FIG. 1.

In S715, it is checked whether the user intent has been determined and, if so, execution continues with S745; otherwise, execution continues with S720. A user intent may be determined as of S715 if, for example, the user directly provided his or her definitive user intent. A user may be able to provide his or her definitive user intent when, for example, the user enters the initial query, upon receiving a prompt after the initial query, and so on.

In S720, a plurality of estimated user intents are determined respective of the query and based on at least one environmental variable as described in detail above. The estimated user intents can also be determined using one or more personal variables that may be correlated with the environmental variables.

In S725, a list of relevant resources from the plurality of resources 130-1 through 130-$n$ is determined for the received query respective of the determined estimated user intents. Relevant resources may be, but are not limited to, resources that would be appropriate for a particular user intent. Appropriateness of resources to user intents is described further herein above with respect to FIG. 1.

In S730, a personalized home screen is generated to include the resources 130 determined to be relevant. The generated home screen is displayed over the user's device.

In S735, a user selection is received as further described hereinabove. In S740, respective of the user selection, the definitive user intent is determined.

In S745, a personalized home screen is generated to include the resources 130 determined to be relevant.

In S750, it is checked whether execution should continue and, if so execution continues with S705; otherwise, execution terminates.

As an example, if the user enters the query term "Madonna", the user intent may be to watch video clips of the entertainer Madonna, buy tickets to Madonna's concert, and so on. In such a case, a resource of a streaming website showing Madonna's video clip may be determined as appropriate to serve one estimated intent and a resource that allows users to purchase tickets to Madonna's performance in New York city may be determined as appropriate to serve a different intent. Therefore, links to such resources will be displayed over the display of the user device 120. In a case where the user scrolled over the icon of the resource to a streaming website showing Madonna's video clip, one or more resources determined as appropriate to serve the intent "watch Madonna's video clips" will be displayed over the display of the user device 120.

A person of ordinary skill in the art would readily appreciate that the operation of displaying a dynamic home screen as described in FIG. 6 and the operation of displaying a dynamic home screen respective of the intent of a query as described in FIG. 7, may be integrated without departing from the scope of the disclosed embodiments.

Figure 8:
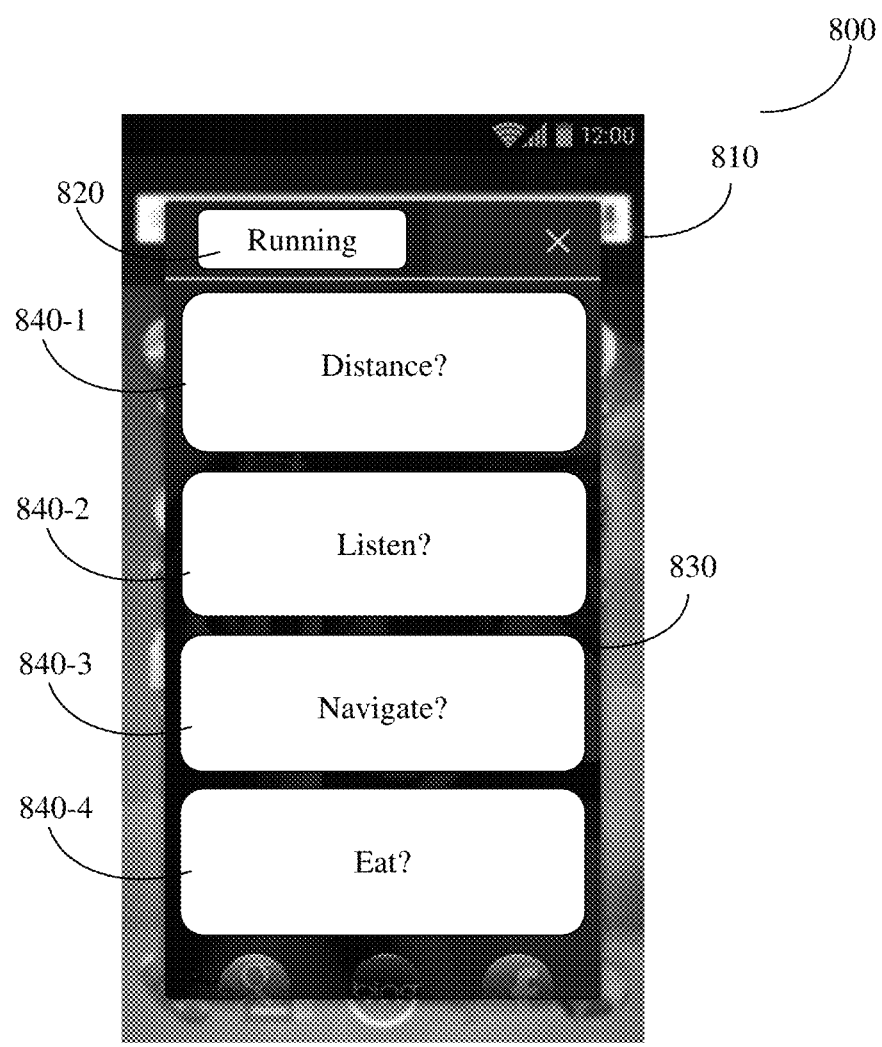
FIG. 8 is a screenshot of a screen of a mobile device that displays the estimated user intents on a device in accordance with an embodiment.

FIG. 8 shows an exemplary and non-limiting screenshot 800 of a screen of a typical mobile device 810. The user is identified as moving at a running pace and, therefore, the input query 820 is running. A display segment 830 is provided over which one or more estimated intents are determined. The one or more estimated intents are displayed on the user device as tabs 840-1 through 840-4, wherein each tab represents an estimated intent. Upon receiving a gesture from a user such as a click over the tab, the definitive user intent will be determined respective thereto.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for dynamically generating and displaying a new home screen on a display of a user device, comprising:

dynamically selecting, by the user device, a plurality of resources of information based on a determined user intent, wherein each selected resource has a representative icon, wherein the user intent represents a determination by the user device of at least one action at the user device that is of interest to the user at a current moment and wherein the determination is based on a correlation analysis for at least one personal variable and at least one environmental variable each of which is received by the user device in real time;

generating, at the user device, a new home screen for the user device, the new home screen including at least an area with display segments for each of at least a subset of the selected plurality of resources, wherein the icons of the plurality of the dynamically selected resources of the subset are displayed in the respective display segment for that resource; and causing a display of the new generated home screen on the user device, wherein each of the icons is configured to communicate directly over a network with its respective one of the plurality of resources.

2. The method of claim 1, wherein each of the at least one input variable is any of: an environmental variable, and a personal variable.

3. The method of claim 2, wherein the personal variable is any one of: a profile of the user, and demographic information related to the user.

4. The method of claim 2, wherein the environmental variable is any one of: a search history, a time of day, a list of social friends as posted on a social web site, location information, motion information, and weather information.

5. The method of claim 2, wherein the at least one input variable is received from any one of: the user device, and an external database.

6. The method of claim 1, wherein each of the plurality of resources of information is any one of: a search engine, a content provider server, a vertical comparison engine, a content publisher server, and a mobile application installed on the user device.

7. A non-transitory computer readable medium having stored thereon instructions for causing one or more processing units to execute the method according to claim 1.

8. The method of claim 1, wherein the determining is further based on a received search query.

9. The method of claim 1, further comprising:
receiving an indication of a selection by a user of a one of the displayed icons;
selecting a plurality resources from the available resources of information that are most appropriate to fulfill the user intent as further evidenced by the received selection;
generating, at the user device, a further new home screen including in part icons of the plurality of the selected resources of information that are most appropriate to fulfill the user intent as further evidenced by the received selection; and
displaying the further new generated home screen on the user device.

10. The method of claim 1, wherein at least one of the plurality of selected resources of information is located remotely from the user device.

11. A user device for dynamically generating and displaying a new home screen on a display of the user device, comprising:
a processor; and
a memory, the memory containing instructions that, when executed by the processor, configures the user device to:
dynamically select a plurality of resources of information based on a determined user intent, wherein each selected resource has a representative icon, wherein the user intent represents a determination by the user device of at least one action at the user device that is of interest to the user at a current moment and wherein the determination is based on a correlation analysis for at least one personal variable and at least one environmental variable each of which is received by the user device in real time;
generate a new home screen for the user device, the new home screen including at least an area with display segments for each of at least a subset of the selected plurality of resources, wherein the icons of the plurality of the dynamically selected resources of the subset are displayed in the respective display segment for that resource; and
cause a display of the new generated home screen on the user device, wherein each of the icons is configured to communicate directly over a network with its respective one of the plurality of resources.

12. The user device of claim 11, wherein each of the at least one input variable is any one of: an environmental variable, and a personal variable.

13. The user device of claim 12, wherein the personal variable is any one of: a profile of the user, and demographic information related to the user.

14. The user device of claim 12, wherein the environmental variable is any one of: a search history, a time of day, a list of social friends as posted on a social web site, location information, motion information, and weather information.

15. The user device of claim 14, wherein the at least one input variable is received from any one of: the user device, and an external database.

16. The user device of claim 11, wherein each of the plurality of resources resource of information is any one of: a search engine, a content provider server, a vertical comparison engine, a content publisher server, and a mobile application installed on the user device.

17. The user device of claim 11, wherein the memory contains further instructions that, when executed by the processor, configures the user device to further base the determining on a received search query.

18. The user device of claim 11, wherein the memory contains further instructions that, when executed by the processor, configures the user device to:
receive an indication of a selection by a user of a one of the displayed icons;
select a plurality resources from the available resources of information that are most appropriate to fulfill the user intent;
generate, at the user device, a further new home screen including in part icons of the plurality of the selected resources of information that are most appropriate to fulfill the user intent; and
display the further new generated home screen on the user device.

19. The method of claim 11, wherein at least one of the plurality of selected resources of information is located remotely from the user device.

* * * * *